United States Patent
Jost et al.

(10) Patent No.: US 12,003,375 B2
(45) Date of Patent: *Jun. 4, 2024

(54) METHODS AND SYSTEMS FOR SERVICE POLICY ORCHESTRATION IN A COMMUNICATION NETWORK

(71) Applicant: Swisscom AG, Bern (CH)

(72) Inventors: Frank-Peter Jost, Zollikofen (CH); Christof Wagner, Ostermundigen (CH)

(73) Assignee: SWISSCOM AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,021

(22) Filed: Apr. 14, 2023

(65) Prior Publication Data

US 2023/0254212 A1 Aug. 10, 2023

Related U.S. Application Data

(63) Continuation of application No. 17/327,989, filed on May 24, 2021, now Pat. No. 11,671,326, which is a continuation of application No. 16/549,613, filed on Aug. 23, 2019, now Pat. No. 11,336,526.

(30) Foreign Application Priority Data

Aug. 24, 2018 (EP) ..................... 18190823

(51) Int. Cl.
*H04L 41/0893* (2022.01)
*H04L 41/00* (2022.01)
(Continued)

(52) U.S. Cl.
CPC ...... *H04L 41/0893* (2013.01); *H04L 41/0246* (2013.01); *H04L 41/20* (2013.01); *H04L 41/5003* (2013.01)

(58) Field of Classification Search
CPC . H04L 41/0893; H04L 41/0246; H04L 41/20; H04L 41/5003; H04L 41/0894;
(Continued)

(56) References Cited

U.S. PATENT DOCUMENTS 9,037,532 B1 5/2015 Pradhan et al.
9,813,285 B1 11/2017 McGovern et al.
(Continued)

OTHER PUBLICATIONS

Extended European Search Report for EP18190823, dated Feb. 18, 2019, 10 pages.
(Continued)

*Primary Examiner* — El Hadji M Sall
(74) *Attorney, Agent, or Firm* — McAndrews, Held & Malloy, Ltd.

(57) ABSTRACT

Methods and systems are provided for service policy orchestration in a communication network. Executing a service policy in the communication network may include, at a service policy execution factory (SPEF), initiating a service policy request, evaluating the service policy request, selecting a unique service event identifier (ID) from a service repository, creating, based on the evaluating, a distributed service event object, where the creating includes defining dynamic elements to be included in the distributed service event object, sending the distributed service event object with the unique service event ID to an event broker that forwards, based on the distributed service event object, operator specific event data to one or more operator access domains, and in response to receiving from the event broker a new service event object, processing the received new service event object, and updating information associated with a corresponding operator access domain (OAD) based on the processing.

20 Claims, 7 Drawing Sheets

(51) Int. Cl.
*H04L 41/0246* (2022.01)
*H04L 41/5003* (2022.01)

(58) Field of Classification Search
CPC . H04L 65/80; H04L 41/5025; H04L 41/5051; H04L 41/5054; H04L 41/5006; H04L 41/5045; H04W 28/24
See application file for complete search history.

(56) References Cited

U.S. PATENT DOCUMENTS

| | | |
|---|---|---|
| 2012/0044868 A1 | 2/2012 | Faccin et al. |
| 2012/0154126 A1* | 6/2012 | Cohn ............... H04L 12/2827 340/10.5 |
| 2013/0021933 A1 | 1/2013 | Kovvali et al. |
| 2013/0298244 A1* | 11/2013 | Kumar ................ G06F 21/51 726/25 |
| 2017/0208016 A1 | 7/2017 | Lehane et al. |
| 2018/0077024 A1 | 3/2018 | Zhang |
| 2018/0220277 A1 | 8/2018 | Senarath et al. |
| 2018/0220315 A1 | 8/2018 | Andersson et al. |

OTHER PUBLICATIONS

Standard 3GPP TS 23.203 Policy and charging control architecture, (https://portal.3gpp.org/desktopmodules/Specifications/SpecificationDetails.aspx?specificationId=810), 1 page.
European Examination Report for EP18190823.7, dated May 18, 2021, 10 pages.

* cited by examiner

METHODS AND SYSTEMS FOR SERVICE POLICY ORCHESTRATION IN A COMMUNICATION NETWORK

CLAIM OF PRIORITY

This patent application is a continuation of U.S. patent application Ser. No. 17/327,989, filed on May 24, 2021, which is a continuation of U.S. patent application Ser. No. 16/549,613, filed on Aug. 23, 2019, which in turn claims the filing date benefit of, and right of priority to European (EP) Patent Application Serial No. 18190823.7, filed on Aug. 24, 2018. Each of the above applications is hereby incorporated herein by reference in its entirety.

TECHNICAL FIELD

The present disclosure relates to communication solutions. In particular, various embodiments in accordance with the present disclosure relate to methods and systems for supporting service policy orchestration in communication networks.

BACKGROUND

Conventional solutions for managing service policies in communication networks, if any existed, are costly, cumbersome and inefficient. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Systems and/or methods are provided for service policy orchestration in a communication network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which.

DETAILED DESCRIPTION

Figure 1:
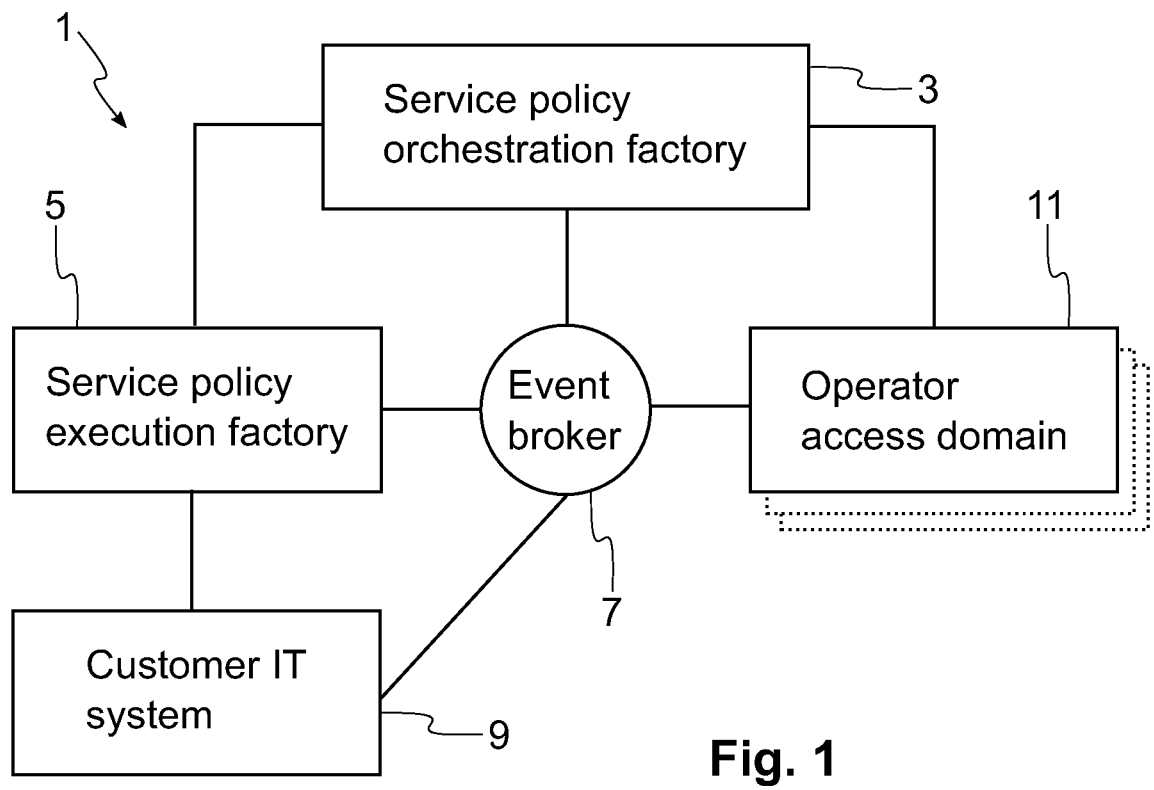
FIG. 1 is a block diagram illustrating some elements of a communication network, which may be useful for understanding the teachings of the present invention

As utilized herein the terms "circuits" and "circuitry" refer to physical electronic components (e.g., hardware), and any software and/or firmware ("code") that may configure the hardware, be executed by the hardware, and or otherwise be associated with the hardware. As utilized herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein, "repository" is a central place (e.g., a database) in which an aggregation of data is kept and maintained in an organized way, usually in computer storage. A repository may be directly accessible to users or may be a place from which specific databases, files, or documents are obtained for further relocation or distribution in a network. A repository may be just the aggregation of data itself into some accessible place of storage or it may also imply some ability to selectively extract data.

As utilized herein, "policy" may create quality of service (QoS) profiles for users and/or services which are applied across the entire network or subnetwork.

As utilized herein, "rule" may be a statement that establishes a principle or standard, and serves as a norm for guiding or mandating an action or a conduct.

As utilized herein, "orchestration" is the automated arrangement, coordination, and/or management of computer systems, middleware, and/or services.

As utilized herein, a "domain" contains a group of computers or network elements that may be accessed and administered with a common set of rules.

As utilized herein, an "access domain" comprises the communication network (wireless and/or wired) access infrastructure (e.g., 2G, 3G, 4G radio access network, cables and/or fibers) of a licensed network operator.

As utilized herein, a "network domain" comprises the core network (wireless and/or wired) infrastructure (e.g., IP multimedia subsystem (IMS), evolved packet core (EPC), user data management (UDM), mobile switching station (MSS)) of a licensed network operator.

As utilized herein, a "service domain" comprises the service network (wireless and/or wired) infrastructure (relating, e.g., to voice over long-term evolution (LTE), rich communication service (RCS), messaging, short messaging service (SMS), multimedia messaging service (MMS), data services) of a licensed network operator.

As utilized herein, an "operator domain" may comprise the access domain, network domain and/or service domain.

Example implementations in accordance with the present disclosure are directed to systems and/or methods of orchestrating a service policy in a communication network. An example implementation in accordance with the present disclosure may allow a communication session party to request a desired quality of service (QoS) for a selected service in the communication network, and/or may include use of a communication network element configured to implement functions associated orchestrating service policies to a communication network.

In this regard, quality of service (QoS) is a measurement of the overall performance of a service, such as a voice or data service, and more particularly the performance seen by the users of the communication network. To quantitatively measure QoS, several aspects related to the network service are often considered, such as bandwidth (rate of data transfer, bit rate or throughput), packet loss, latency (measure of time delay required for information to travel across a network), availability (proportion of time a system is in a functioning condition), jitter (difference in end-to-end one-way delay between selected packets in a flow with any lost packets being ignored), priority (priority relative to simultaneous resource-competing data flows in the same network) etc.

In the field of computer networks and other packet-switched telecommunication networks, QoS may refer to control mechanisms for traffic prioritization and/or resource reservation, rather than the achieved service quality. QoS may thus be considered to be the ability to provide different priorities to different applications (or services), users, or data flows, or to guarantee a certain level of performance to a data flow.

Quality of service (QoS) may be particularly important for the transport of network traffic with special requirements. In particular, it may be possible to use voice over internet protocol (VoIP) technology to allow computer networks to become as useful as telephone networks for audio conversations, as well as supporting new applications with even stricter network performance requirements. Consequently, current mobile communication networks or systems are IP based and therefore must handle the different QoS requirements of the application or service. However, currently these requirements are implemented as static rules such that an application either gets a data bearer with the QoS settings the user has subscribed to (irrespective of the application requiring these QoS settings), or the application requests a predefined bearer (e.g., a voice over long-term evolution (VoLTE) capable bearer). Such static implementations may work relatively well within a single monolithic network, but may have limitations in some use cases (e.g., overload or crisis). With the advent of 5G network topologies, which may allow slicing, edge-computing, and network sharing, new solutions may be required to ensure that applications or services may access a data bearer with the requested QoS settings, even if the network is overloaded or in crisis situations.

However, QoS related aspects are merely one example of aspects related to service policies. In this regard, as uses in the disclosure, the term "service policy" may also covers other aspects, such as handover rules between operator access domains. Currently there is no reliable solution for orchestrating service policies in non-monolithic networks—e.g., networks operated by different independent operators.

For example, in some existing solutions, abstract service requests may be decomposed into resource rules, which may be done by receiving an abstract service request (e.g., a request specifying a functional requirement) via an exposed public interface, generating domain-specific resource rules based on the received abstract service request, identifying relevant components in a telecommunications domain for enforcing the generated domain-specific resource rules, and sending the domain-specific resource rules to the identified components (e.g., online charging server, policy management server, etc.) for enforcement. Generating domain-specific resource rules based on the received abstract service request may include generating the rules consistent with the existing resource rules of the domain.

Accordingly, solutions in accordance with the present disclosure may allow for orchestrating service policies in a communication network in a manner that overcome the problems, shortcoming, and/or deficiencies in existing solutions (e.g., as described above). In particular, in an example implementation of the present disclosure, a method of orchestrating a service policy in a communication network may be provided. The communication network may comprise a service policy orchestration factory, a service policy execution factory providing an interface for users of the communication network through an application programming interface, and at least one operator access domain. The method comprising the following steps, which may be carried out by the service policy orchestration factory: receiving a service instance object and a first service event object from the service policy execution factory, the service instance object defining directly or indirectly service execution requirements, and the first service event object defining an update of a current service execution policy; updating a service repository of the service policy orchestration factory with the first service event object and the service instance object; selecting, based on a first mapping table, at least one operator access domain linked to the first service event object for executing a service linked to the service policy; sending the first service event object and an operator specific service identifier linked to a respective operator access domain to the selected at least one operator access domain to allow the at least one operator access domain to update its service repository; receiving a first feedback data set from the at least one operator access domain, the first feedback data set comprising an operator domain identifier per operator access domain indicating a successful orchestration; updating a second mapping table with at least the received operator domain identifier(s); and sending a second feedback data set to the service policy execution factory to complete the service policy orchestration.

Solutions in accordance with the present disclosure may have the advantage that new service policies may be reliably orchestrated in a communication network, which may be a non-monolithic communication network. A service policy request may be a network configuration change request, which may relate to QoS requirements and/or handover rules between operator access domains and/or to enforcing governmental rules regarding network services such as the handling of voice and data traffic in an emergency situation. For example, the teachings of the present invention allow a service requesting party to obtain a desired QoS even if the network of the service requesting party is overloaded or is in a crisis situation.

Solutions in accordance with the present disclosure incorporate various features that existing solutions may lack, such as receiving a service instance object and a first service event object from the service policy execution factory; updating a service repository of the service policy orchestration factory with the first service event object and the service instance object; the first feedback data set comprising an operator domain identifier per operator access domain indicating a successful orchestration; updating a second mapping table with the received operator domain identifier(s); and sending a second feedback data set to the service policy execution factory to complete the service policy orchestration.

Further, existing solutions may include features that are not included and/or may not be necessary in solutions in accordance with the present disclosure, such as a feedback loop established between a respective domain and a continuum orchestrator. In this regard, in implementations in accordance with the present disclosure, there is no need to establish any loop. Rather, any feedback may be delivered by the components involved in orchestrating the services policies (e.g., the access domain, the service policy orchestration factory, and the service policy execution factory). Further, in existing solutions, feedback loops are only used minimally—e.g., to ensure that the actual quality of service measured in each domain is greater than or equal to the intended quality of service.

An example implementation in accordance with the present invention may be targeted to a situation with several independent operators, each with their own policy rule set(s). This may allow for rejecting a service request, and the requesting entity may then advantageously make a decision regarding new requests based on the new information. Further, a domain may be allowed to send alarms which are not directly service request related but are indications about current service limitations due to, e.g., outage of a network element or node. Such information may be used by the service domain to request a new policy for the other domain. Existing solutions, however, do not offer or include such features.

In an example implementation, a computer program product is provided, arranged to execute method(s) in accordance with solutions implemented in accordance with the present disclosure.

In an example implementation, a communication network element is provided, arranged to implement and/or carry out actions in accordance with solutions implemented in accordance with the present disclosure.

In an example implementation, a service policy orchestration factory is provided, arranged to implement and/or carry out actions in accordance with solutions implemented in accordance with the present disclosure.

Implementations in accordance with the present disclosure may be used in conjunction with various use cases. In some instances, example implementations may be applied to use cases relating to distributed operator access domains. In this regard, a service may be provided over two or more distributed operator access domains (e.g. network slices). Each operator access domain has its own QoS policy control, which assigns a dedicated data bearer per application. In an example implementation, may allow for seamless movement of users between the operator access domains, for ensuring that the application may use a data bearer with the same QoS settings regardless of the operator access domain to which a user is attached. In an example implementation, moving to another operator access domain may be enforced if the current operator access domain or slice may not provide sufficient QoS.

In some instances, implementations may be applied to use cases relating to service orchestration and provisioning across two or more networks related use cases. In this regard, a service provider orchestrates services over two or more communication networks. While the service has equal QoS requirements, the networks may have different application programming interfaces (APIs) and methods to enforce those requirements. In an example implementation, a harmonized interface may be provided for service providers to request the QoS in different access networks.

In some instances, implementations may be applied to use cases relating to policy overrules. In this regard, in some cases, a policy should be manually overruled. For example, in case of a crisis, a government may request exclusive access for public protection and disaster relief (PPDR) personnel in certain geographical areas or the entire slice. Another example would be a differentiation between on-duty and off-duty status. If a user is on-duty, they shall have a defined QoS for their services while if they are off-duty, they shall have the QoS assigned to their normal subscription with an operator.

In some instances, implementations may be applied to use cases relating to dynamic policy selection. In this regard, when a user is using a variety of services simultaneously (maybe even over several end user devices), each service has its own QoS requirements and each combination of those services/requirements will result in a single dedicated policy per variant. For example, a PPDR user is on duty and has two active applications on their device: a push-to-talk application and a tracker. Because of the specific requirements of this application, the use is attached to a dedicated PPDR network slice with guaranteed throughput and QoS but limited total bandwidth. Now this PPDR user additionally starts a high-quality video application (e.g. a bodycam) but the active radio network slice is not capable to carry the traffic without service restriction to other PPDR users. In an example implementation, such a situation may be detected, and the current network may be instructed to move the user to another radio network with sufficient available resources.

When applied to such use cases, example implementations in accordance with the present disclosure may incorporate such features as: common definition of service policy rules; providing only the operator with the authority to decide whether or not and how service policies are executed on its network (except for requests with a legal obligation to execute them); customizable solution to adapt to individual operator access domain infrastructures; central API for customer information technology (IT) infrastructure to request a service policy execution; access domain feedback about service policy requests; forced (e.g. a legal obligation given by a government agency) execution of service policies; and scheduled/delayed execution of service policies (in preparation of upcoming events).

An example architecture, which may be utilized in various implementation in accordance with the present disclosure, comprises at least a service provider, one or more access providers and an orchestration entity. The following description assumes that the services are already orchestrated between the service provider and the access domains. Therefore, a database exists where the relationships between service providers, services and access domains are stored. A service provider offers one or more services. Each service is provided via one or more operator access domains. A service customer or subscriber has subscribed to one or more services. Additionally, a service customer may use one or more devices characterized by one or many device capabilities. To execute a service policy, the required or associated machine/device configuration needs to be known. However, such information is operator and vendor specific and thus may not be part of the orchestration. For the sake of simplicity, it is assumed that such information is provided by the operator of the access domain to which the service costumer has subscribed whenever needed. Each operator has one or more infrastructure elements deployed in its access domain. Each Infrastructure element is configured to create one or more machine events and may process one or more machine configuration rules. A machine event is usually an alarm indicating for instance that the requested and contracted QoS may not be provided. Machine events may be triggered for example by operator access domains.

In a first step of the service policy orchestration process, service requirements are created and orchestrated. In other words, in this step, service requirements are orchestrated amongst the participating entities, which are the service provider and the access domain operator(s) based on existing information (which service is provided by a particular operator access domain). The service requirements are defined per service. Each service is associated with one or more QoS requirements as well as one or more service requests. Furthermore, each QoS requirement may have one or several device capabilities assigned to it. After the first step, each participating entity is aware of the relevant service requirements.

In a second step, service events and related rules, and more specifically generic service execution rules, are created and orchestrated. The generic service execution rules will be converted or transformed into operator specific machine configuration rules. Each service request has one or more service events assigned to it. Each service event on the other hand has one or more generic service execution rules assigned to it, which are converted into one or more operator specific machine configuration rules.

An operator specific machine event may result in a service event. However, the relationship between machine events and service events is specific for each service and may not be orchestrated. Operator specific machine events are orchestrated as such but are not related to service events. In the second step, the service event broker rules are also created. These rules define which service events are forwarded to which operator access domain(s). Each service event has one or several service event broker rules assigned to it. Each service event broker rule is then associated with a relevant service provider and operator.

In a third and last step, a service policy request is handled. This request may for example relate to updating handover rules in the wireless communication network.

The main elements are structured into four domains: a customer domain, a service domain, an event broker domain and an operator access domain. To simplify the further description of the present invention, devices and device capabilities are not taken into consideration. Considering device capabilities would result in very complex execution rules due to the plurality of devices and capabilities. The proposed solution is thus device-independent.

FIG. 1 is a block diagram illustrating some elements of a communication network, which may be useful for understanding the teachings of the present invention. Shown in FIG. 1 is a communication system or network 1.

The communication system or network 1 may comprise various elements configured to perform various functions in accordance with the present disclosure. In this regard, each of the elements of the communication system or network 1 may comprise suitable circuitry for implementing various aspects of the present disclosure. Such circuitry may comprise, for example, general or dedicated processing circuitry, storage circuitry, communication-related circuitry, etc. In some instances, a network element may be implemented as a single physical apparatus, which may reside centrally in the network. In other instances, however, the various steps and/or related operations may be performed by various different components and/or subsystems of the network. In this regard, the different components and/or subsystems may interact with each other, and data or control services may be performed or handled either in a centralized way, or may have their functionalities distributed among the different subsystems, for example leveraging the cooperation between the different subsystems.

As shown in FIG. 1, the communication system or network 1 may comprise a service policy orchestration factory (SPOF) or element 3, a service policy execution factory (SPEF) or element 5, an event processing element or unit (referred to as an event broker) 7, a user device and/or customer IT system 9, and one or more operator access domains (OADs) 11.

The SPOF 3 may be operated by a federal government agency. The SPEF 5 may be outsourced by the federal government to a contracted service operator. Further, the SPEF 5 may comprise a customer interface, for interfacing with the event broker 7. The event broker 7 may also be operated by the federal government agency. Each of the SPOF 3, the SPEF 5, the event broker 7, and the user device and/or customer IT system 9 may be physically different data processing elements but which are arranged to communicate with each other. The operator access domains (OADs) 11 may be distributed, for example, as: two radio access networks operated respectively by a provincial government (referred to later as a "public safety operator") and a licensed operator; a core network operated by the licensed operator; and a transport network for interconnection operated by a federal government.

The communication system or network 1 may be configured to incorporate the ability to administer, distribute and execute service policies, such as QoS policies, for a service and/or user over one or more operator access domains whereby the domains and the factories shown in FIG. 1 may be operated by the same or different entities or companies. The SPOF 3 is arranged to orchestrate the service policies amongst the SPEF 5s and the associated operator domains. An example of a service that may be used according to the teachings of the present invention would be a nationwide mission critical push-to-talk service for PPDR users.

Figure 8:
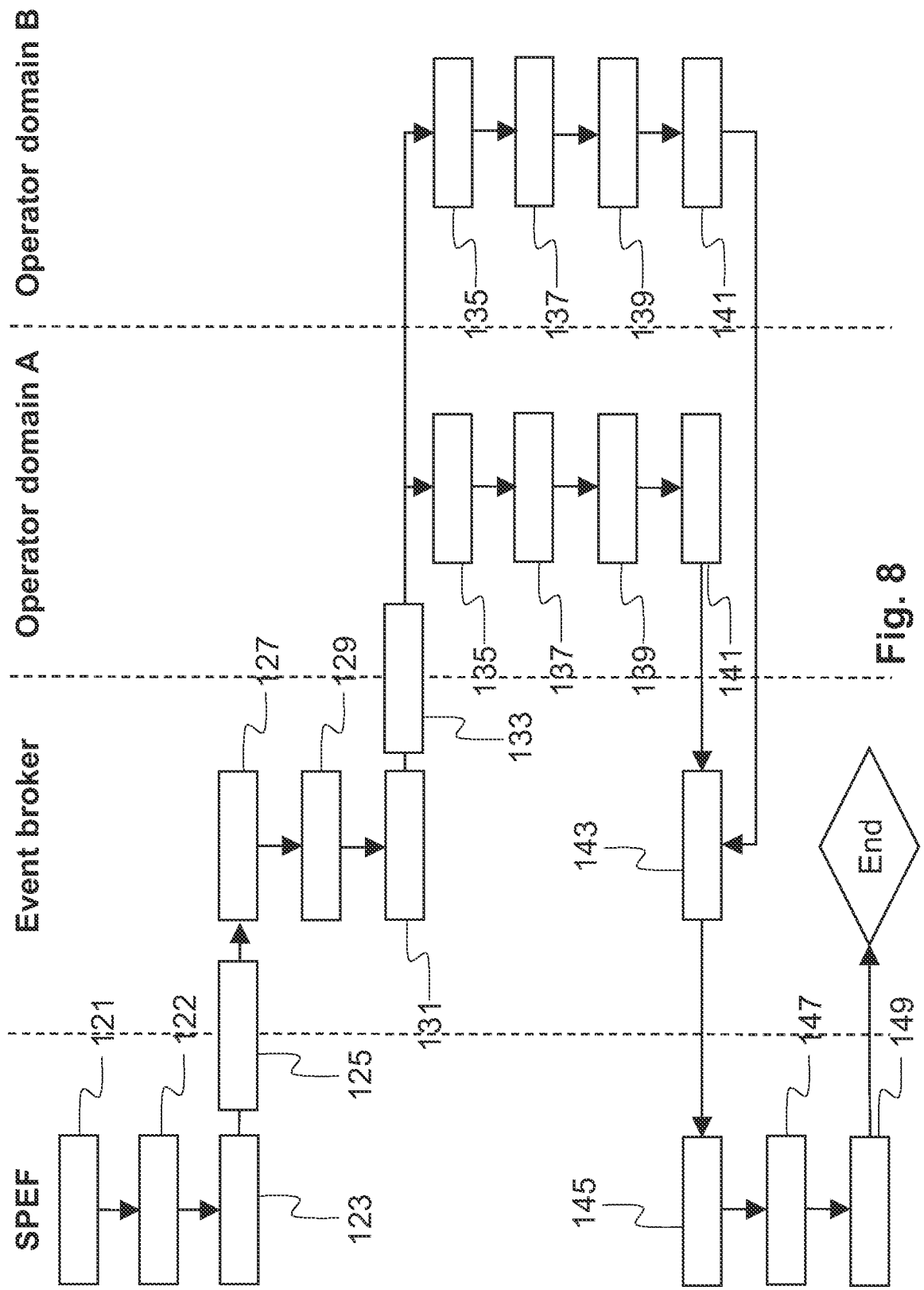
FIG. 8 is a flow chart illustrating a process of executing a service policy in the communication network according to an example of the present invention.

In various use scenarios relating to the example implementation shown in FIG. 8, four parties may be involved: 1) an orchestration operator, which is responsible for the orchestration of rules and events; 2) a service provider, which is responsible for service provisioning and QoS controlling; 3) a licensed operator, which is responsible for the network access and transport; and 4) a customer of a service provider who has subscribed to a service. The required number of elements per setup (which may cover a single country or a larger geographical area) and the responsible operators are shown in the table below:

| Element | Number of elements | Ownership/operated by |
| --- | --- | --- |
| SPOF | One | Orchestration operator |
| SPEF | One per service | Each by service provider |
| Event broker | One | Orchestration operator |
| Operator access domain | Several | Each by licensed operator |
| Customer IT system | Several | Each by service provider customer |

The service policy may comprise at least one of the following elements: QoS requirements, handover rules between operators, and governmental rules. In this regard, QoS requirements may relate to a specific service and/or a specific situation. For instance, a crisis situation may arise during which a large number of police force members would gather in a small area requiring a significant portion of available bandwidth. In such instances, the QoS requirement would make it possible to reserve that portion for the police force. The handover rules between operators may also relate to a specific situation.

For example, it is possible to anticipate a situation in which the limited bandwidth of the public safety operator should be cleared from streaming services in order to free up capacity for prioritized voice communications between members of police forces. It could also relate to a situation in which one operator access domain of one operator issues events indicating capacity problems resulting in changing handover rules to offload the traffic to another operator access domain with more free capacity. The governmental rules may comprise a complete reconfiguration of a network, e.g., during an attack during which the communications are shut down for private users but remain available for police forces and for governmental announcements.

Thus, the service policy requests may be divided into: direct requests, which may be service requests initiated by the SPEF 5 of a user; indirect requests, which may be service requests in response to a machine and/or network event, e.g., outage; and overruling requests, which may be master requests issued, e.g., by the government or another authority resulting in a complete reconfiguration in a given area/domain.

The elements of the communication system or network 1, and interactions therebetween, are described in more detail below.

Figure 2:
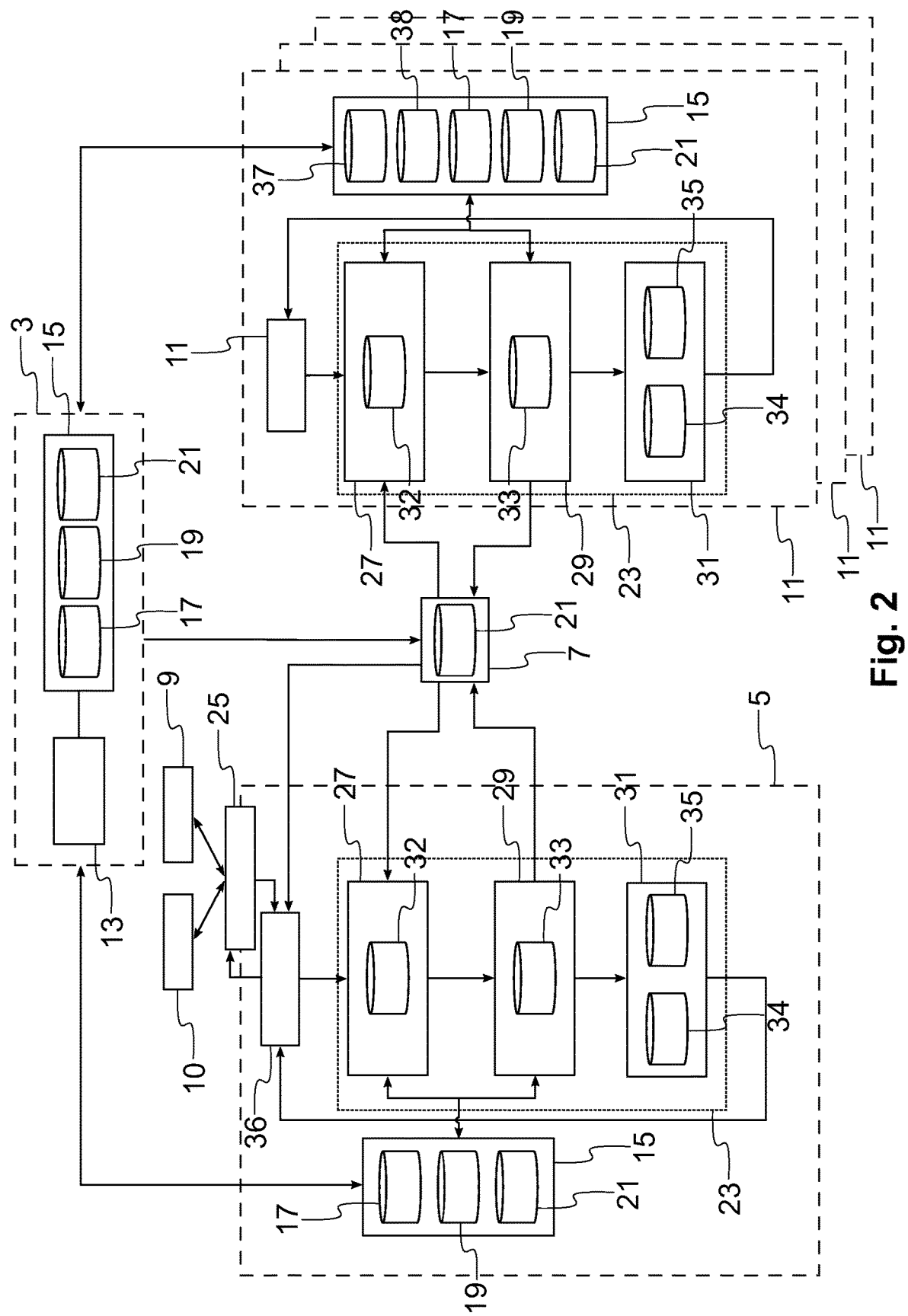
FIG. 2 is a block diagram illustrating in a more detailed manner the elements shown in FIG. 1.

FIG. 2 is a block diagram illustrating in a more detailed manner the elements shown in FIG. 1. Shown in FIG. 2 are the service policy orchestration factory (SPOF) 3, the service policy execution factory (SPEF) 5, the event broker 7, customer IT system 9, and the operator access domains (OADs) 11 of the communication system 1, as described with respect to FIG. 1. In this regard, FIG. 2 illustrates these elements in more detail in accordance with the example implementation.

The communication system 1 comprises one service policy execution factory 5 per service and operator, and one or more operator access domains (OADs) 11. To exchange information elements between the operating parties, such information elements need to be provided in an agreed, structured and common manner. The service policy orchestration factory 3 is responsible for provisioning relevant data objects within the service policy execution factory 5, the OADs 11 and the event broker 7.

In an example implementation (e.g., as shown in FIG. 2), the service policy orchestration factory is a non-real-time element and does not send events or requests to the service policy execution factory or operator access domains. It comprises two main components: 1) a service policy creation and pairing algorithm 13, which is responsible for creating and reconciling objects within a service policy inventory 15; and 2) a service policy inventory or database 15 containing the required repositories. In this example, the service policy inventory 15 comprises a service repository 17 for storing service related information, a user repository 19 for storing user related information and an event repository 21 for storing event related information.

The SPEF 5 provides a customer interface (as explained later) and handles service requests and events, which are translated into QoS policies by a policy enforcement engine 23. These policies are then executed as machine configuration requests. An officer in charge for example may request to increase the QoS for their team members from "normal operation" to "mission critical" and the SPEF 5 would handle that request. Subject to the rule settings, the SPEF 5 creates events for connected operator access domains. In the above example, the "mission critical" request would create an event for the operator access domain requesting them to activate the corresponding QoS settings or, if not possible or desired, configure handover policies that would shift the user to access domains of other operators.

The OADs 11 handle events that are translated or converted into QoS policies through their policy enforcement engine 23 (as explained later). The policies are then executed as machine configuration requests in the domain. If a radio access network (as an example of the radio access domain or subdomain), for example, detects a network overload in a specific area, an event would be sent to the policy enforcement engine, which would determine whether (or not) the overload negatively affects orchestrated services. If it is determined that the overload negatively affects orchestrated services, the policy enforcement engine could, subject to the rule configuration, initiate one or more of the following activities: applying new policies in that area to mitigate the effects on orchestrated services, sending an event (as a feedback message) to the SPEF 5 whose policy enforcement engine would develop and apply a new policy, and sending an event (as a feedback message) to the customer via a customer API 25 who could then initiate a new service request.

As shown in FIG. 2, each one of the OADs also comprises a service policy inventory 15. Compared to the service policy inventory of the SPOF 3, the service policy inventories of the operator domains further comprise an operator capabilities repository 37, which is mainly used to set up the rules for the event broker 7, and a UE capabilities repository 38 for storing UE related information. As they are unique per OAD, they are not orchestrated. It is to be noted that the service, user and event repositories are common objects shared between the factories and domains.

The event broker 7 is the interconnection element or unit between the various policy enforcement engines of the different operators and the SPEF 5. There is typically one event broker per given geographical area, such as a country. The event broker 7 is arranged to verify, evaluate and transfer incoming events to the receiving policy enforcement engine 23 or to the service provider service domains. If it is not possible to agree upon a harmonized data structure and content (e.g., the identity or identifier (ID) for an event is different between the various operator domains), the event broker may reconfigure the content of the incoming event/request. The internal rules of the event broker 7 are provisioned by one or more connected SPOF 3s. As shown in FIG. 2, the event broker 7 comprises an event repository 21 for storing event related information. Optionally the event broker is configured to create charging records as well as explained later. The customer IT system 9, which may be a command and control center, and user devices 10 (e.g., apps or native applications on the device) may submit service requests and receive events via the customer API 25.

Figure 3:
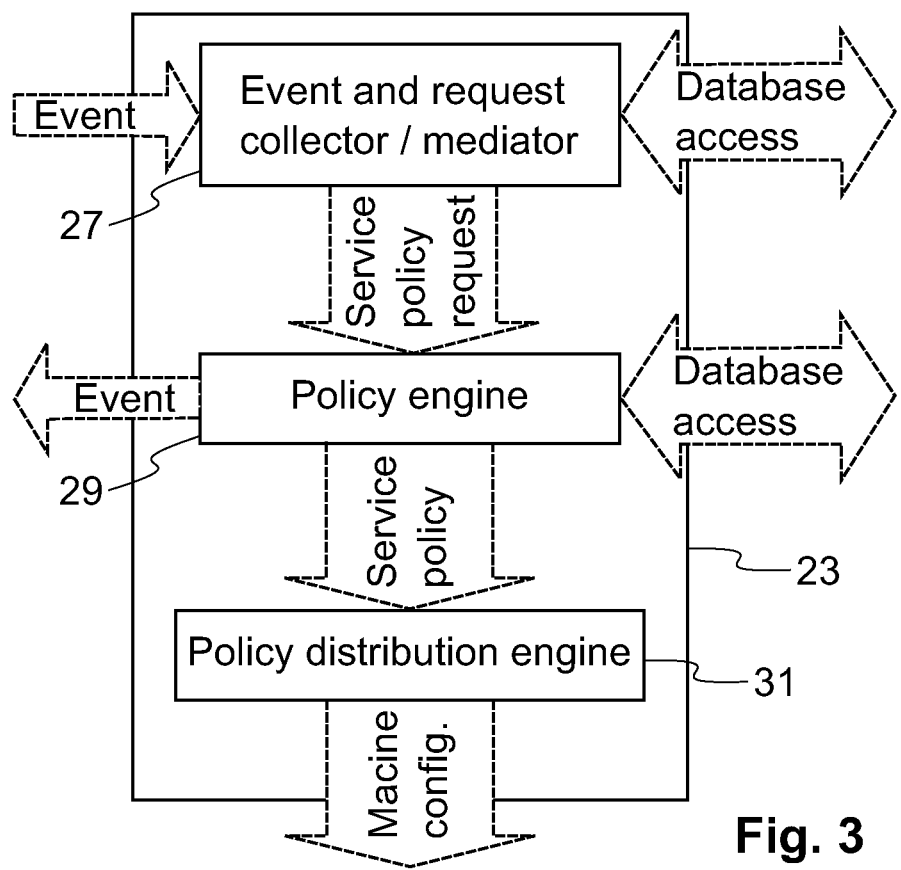
FIG. 3 is a block diagram illustrating a policy enforcement engine shown in FIG. 2.

FIG. 3 is a block diagram illustrating a policy enforcement engine shown in FIG. 2. Shown in FIG. 3 is policy enforcement engine 23.

As illustrated in the example implementation shown in FIG. 3, the policy enforcement engines 23 are arranged to collect requests and events, and to transform or convert them into policies per given rule set and to configure the infrastructure of the operator associated with the policy enforcement engines 23 of the respective SPEFs accordingly.

As shown in FIGS. 2 and 3, in accordance with an example implementation, the policy enforcement engine 23 comprises three functional units, namely an event and request collector/mediator 27, a policy engine or unit 29 and a policy distribution engine or unit 31, which may be deployed in separate security zones within the operator. However, instead of having these three units as separate units, they could be arranged as one single unit or two units. The policy enforcement engines comprise four rules databases. More specifically, the event and request collector/mediator 27 comprises a first rules database 32 for storing abstraction rules, the policy engine or unit 29 comprises a second rules database 33 for storing composition rules, and the policy distribution engine 31 comprises a third database 34 for storing decomposition rules and a fourth rules database 35 for storing distribution rules.

Incoming service policy requests and machine events are collected and verified by the event and request collector/mediator 27. After verification, the requests and events are transformed into harmonized events and forwarded to the policy engine 29. In other words, the event and request collector/mediator 27 converts generic messages or events into specific service policy requests for the subsequently addressed policy engine by using the abstraction rules.

The verification is carried out according to provisioned verification rules, and allows for simpler and more stringent definition of composition rules within the following policy engine 29. Updating or adaptation of additional events and requests is easy as well because only generic events are orchestrated.

A service policy request may be initiated by the user device 10 (e.g., by using an app) or by the customer IT system 9 (e.g., the customer IT infrastructure). Examples of service policy requests may include: an officer requesting a mission critical service for their team members; the command and control center of the customer IT system 9 requesting a guaranteed bitrate bearer for the connectivity to a bodycam of an officer; and a user requesting "on-duty" prioritization.

A service policy request may also be initiated by a service provider service domain 36 if so configured. Examples of service policy requests initiated by the service domain may include: a biometrical user sensor sending a critical alarm. The service domain detects the alarm and sends a service policy request to upgrade the status of other devices (e.g., body cam, localization, a silent listener) to mission critical; and an officer with a mission critical status initiating a call to another officer without a mission critical status. The service domain may then request that the called officer be upgraded to a mission critical status as well.

In some instances, it is also possible that a machine event is triggered by an operator access domain. A machine event is usually an alarm indicating that the requested and contracted QoS may not be provided. Network outages and overload situations are examples of such machine events.

Other policy enforcement engines may also send events. A typical example would be a change in the handover policy for national roaming due to an overload in one access domain. In such a case, both access domains need to be configured accordingly. The policy enforcement engine of the originating domain would then send an event requesting a change in the handover policy via the event broker 7 to the other policy enforcement engines.

The policy engine 29 collects the events and processes them according to the composition rules. The result is a policy that is transferred to the policy distribution unit 31 and/or a subsequent event for another policy enforcement engine to be transferred to the other policy enforcement engine via the event broker 7. Thus, the policy engine 29 may be arranged to create events for external systems, such as the other policy enforcement engines.

The policy distribution engine 31 receives the policy from the policy engine 29, processes it to obtain a machine configuration event, data set or message and distributes it according to predefined rules. The configuration event is used to update the policies of the access domains 11 and/or service domains 31. The configuration event may also provide feedback via its own domain as an event (e.g., configuration successful, error etc.) to the event and request collector/mediator 27.

Figure 4:
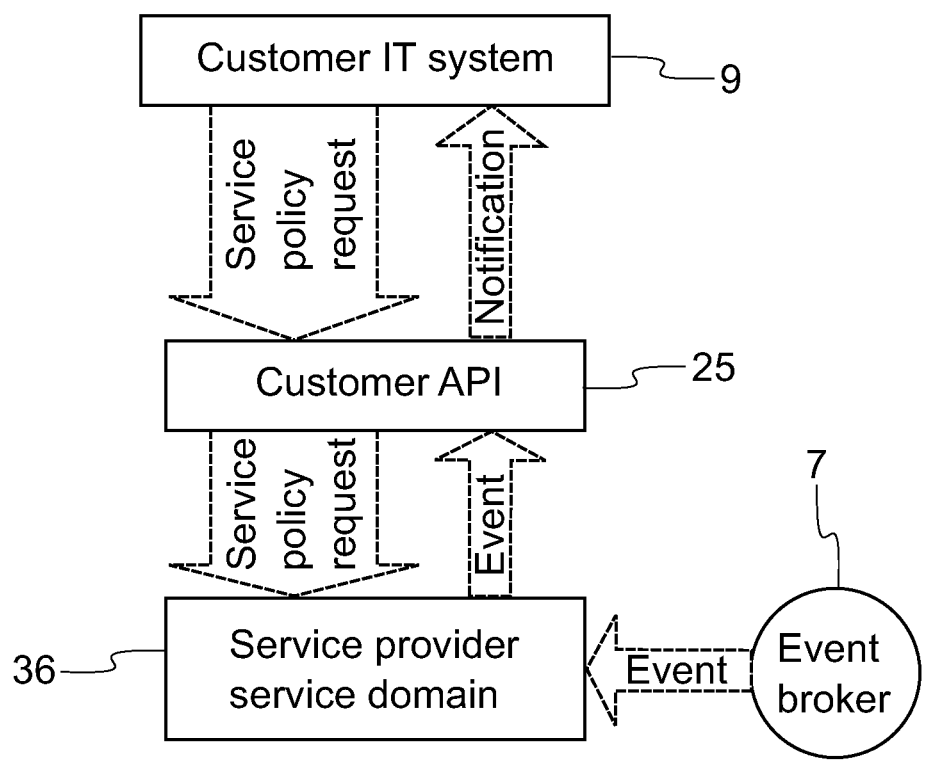
FIG. 4 is a block diagram illustrating an overview of a customer application programming interface shown in FIG. 2.

FIG. 4 is a block diagram illustrating an overview of a customer application programming interface shown in FIG. 2. Shown in FIG. 4 is the customer application programming interface (API) 25 of FIG. 2.

As shown in FIG. 4, the customer API 25 provides an interface for the customer IT infrastructure (including, e.g., the customer IT system 9 and user devices 10) for requesting a new or updated service policy. The customer API 25 validates those requests and forwards them to the event and request collector/mediator 27. The customer API 25 further provides notifications received from the event broker 7 to the customer IT systems. Incoming events are evaluated and sent as notifications to the customer IT systems. Examples of such notifications are, e.g., a network outage notification informing about an outage affecting subscribed services.

A plurality of objects and data structures may be used in conjunction with various example implementations, to facilitate at least some the functions and interactions required in accordance with such implementations. Objects and data structures may be structured, identified, and/or grouped based on various criteria.

For example, structure of orchestrated objects and data based on relevant domain may include [OAD], which refers to an element created and owned by the operator access domain 11; [SPEF], which refers to an element created and owned by the service policy execution factory 5; and [SPOF], which refers to an element created and owned by the service policy orchestration factory. Data structures or objects may also be identified based on type of element. For example, based on the type of element, this may include, [OBJ], which refers to an object containing data, ID, references, instructions and/or other objects; [ID], which refers to an ID or reference; and [DB], which refers to a database.

Orchestrated objects and data may also be structured for service repository. For example, the service repository 17 may contain relevant information about the services, which should be controlled by the SPEF 5. The SPOF is the master of the service repository. Thus, the service repository [DB] may store such elements as: [SPOF] Unique service instance [ID], which uniquely identifies the service within the operator domain; [SPOF] Mapping table for operator specific service [ID], which is a pointer to a mapping table for operator specific services, also referred to as a first mapping table, which lists all operators supporting a given service as well as any operator specific service [ID]s; [OAD] Operator domain [ID], which identifies the operator; [SPEF] Service definition [OBJ], which defines the service and its requirements. It may for instance define at least one of the following: type of service, QoS requirements, bandwidth requirements (min., max), call groups etc. It may also include an ID to another service instance, e.g., to a list of supplementary services for voice. A service instance object comprises a pointer to the service definition object. The service definition object, which becomes available after the service orchestration, is used by the SPEF to define the orchestrated service events; and [SPEF] Service event [OBJ] comprises a list of events, which may be created by the service domain. Each event is identified by an ID.

Orchestrated objects and data may also be structured for user repository. For example, the user repository 19 may contain relevant information about the user and their subscription and subscribed services. The operator access domain to which the user has subscribed is equivalent to the home operator (HO) as the user needs a valid subscription to access the service. Thus, the user repository [DB] may store such elements as [SPEF] and [OAD] User definition [OBJ], which includes, for example, a unique user ID (e.g., a universal unique identifier (UUID)); a mapping table for operator specific user ID, which is a pointer to a mapping table for operator specific users to map the unique user IDs with the operator specific user IDs; user information, such as name, address, contract etc.; and a list of unique service instance IDs for subscribed services.

Orchestrated objects and data may also be structured for event repository. For example, the event repository 21 may define the possible events as well as the brokering rules for the events. Thus, [SPEF] Event [DB] may store such elements as: [SPEF] Unique service event [ID], which uniquely identifies the service across the domains; [SPOF] Unique service event [ID], which uniquely identifies the service; [SPOF] Mapping table for operator specific event [ID], which is a pointer to a mapping table for operator specific events (also referred to as a second mapping table) to map the unique service event ID or the unique machine event ID with operator specific event IDs and event broker rules. It is to be noted that the event may be a service event or a machine event, but these events may be handled by a single mapping table if so desired; [SPEF] or [OAD] Type of event, which may be, e.g., a machine event, a service event, a user generated service event, a domain generated service event, a government event (allowed to issue an event, the criticality of which is "immediate enforcement") etc.; [SPEF] or [OAD] Criticality, which defines how quickly the request should be executed. The criticality may be for example immediate enforcement (e.g., if required by a government), immediate (the operator may be allowed to reject this), medium, best effort etc.; [SPEF] or [OAD] Lifetime, which defines the lifetime or validity of the request optionally in discrete steps as well as indefinite or pending until further notice; [SPEF] or [OAD] Area, which defines the area where the event should be executed or is valid. The area may be, e.g., a political area; [SPEF] Generic service execution rule, which defines the execution rule associated with the service event; [OAD], Unique machine event, which defines operator specific machine events, such as alarms etc. These events are not related to a specific service; and Parameters "criticality", "lifetime" and "area" as well as a unique session key are defined upon creating an orchestrated service event (object).

The resulting unique event object is then forwarded via the event broker 7 to the relevant SPEF or operator access domain. The SPEF and/or operator access domain may store such incoming events by using the unique session key. It is to be noted that a service event object may comprise the following elements/parameters: a unique service event ID, a unique session key, a unique service instance ID, a mapping table for operator specific events, a type of event, criticality, lifetime, an area, a generic service execution rule and a timestamp, whereas a machine event object may comprise the following elements/parameters: a unique machine event ID, a unique session key, a mapping table for operator specific events, a type of event, an area, criticality and a timestamp.

The orchestrated service object and/or the machine event object may be populated with static information or a list of supported parameters for this event. For example, the parameters type of event, criticality, lifetime and area are populated with a list of supported parameters at the time of orchestration, but specific parameters in a distributed service/machine event are selected for that event.

For instance, the parameter "area" could include a list of various areas in a given country, such as states, cantons, cities, etc., or possibly a spatial definition of an area. These define the allowed parameters that could be used in a distributed object. The distributed object may contain only one parameter out of this list, e.g., "Berne" for the parameter area. In other words, the distributed object contains a selection or sub-selection of the available parameters from the static, non-distributed object.

To differentiate between orchestrated and the distributed event objects, a unique session key and/or a timestamp are introduced for the distributed objects that distinguish an orchestrated (generic or static) event from a distributed (specific) event.

Figure 5:
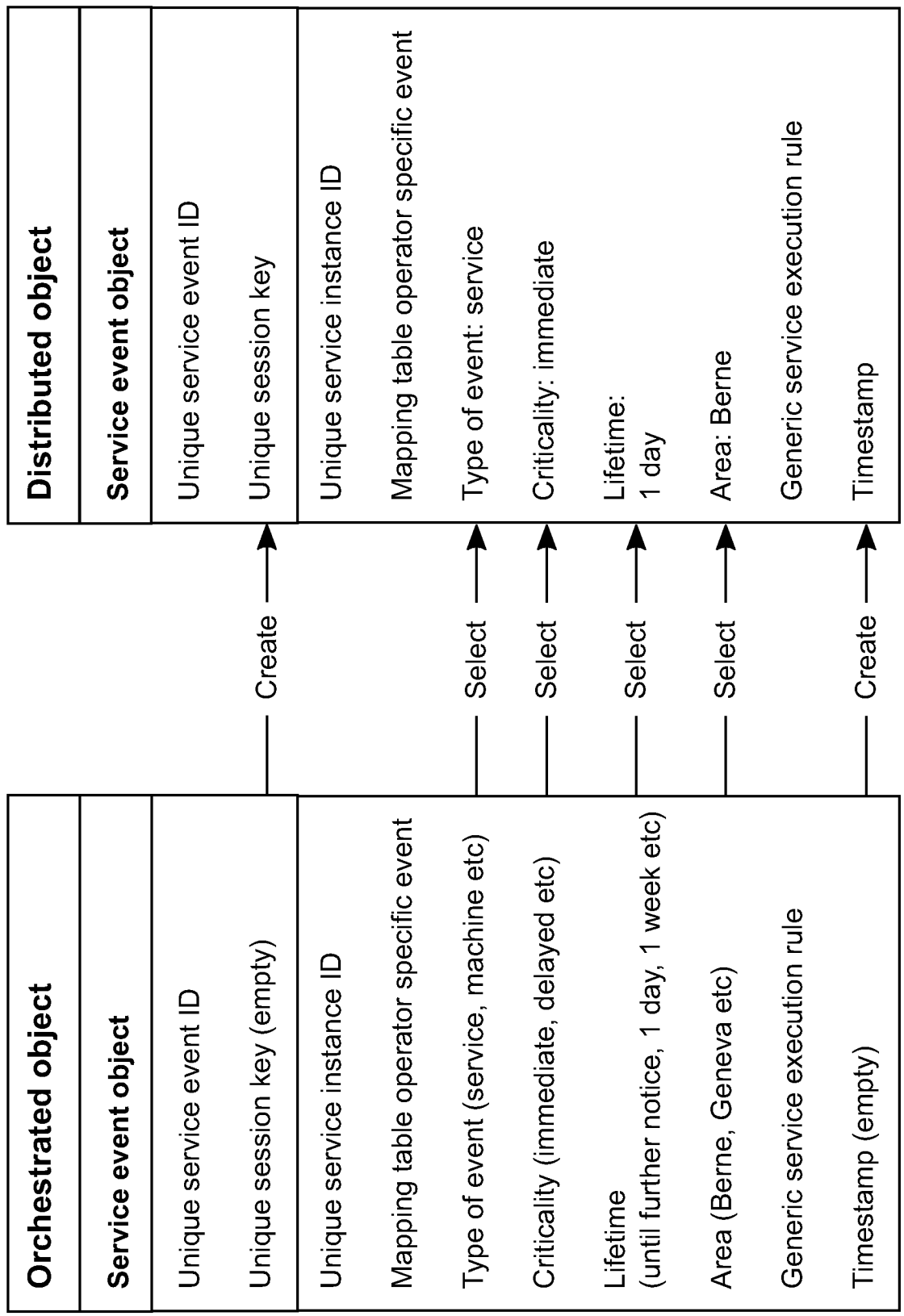
FIG. 5 is a block diagram illustrating the relationship between orchestrated and distributed service event objects according to an example of the present invention.

FIG. 5 is a block diagram illustrating the relationship between orchestrated and distributed service event objects according to an example of the present invention. Shown in FIG. 5 are example relationships between the orchestrated and distributed service event objects, as described with respect to FIG. 4.

In this regard, the distributed object (model) contains all the relevant information for the request. Timestamp and unique session key are created together with the distributed object. Parameters that are copied from the orchestrated object are unique service event ID, unique service instance ID, mapping table for operator specific events and the generic service execution rule definition.

Parameters, also referred to as dynamic elements, which are selected from the list of supported values given in the orchestrated object are type of event, criticality, lifetime and area. Optionally, the event broker 7 may create charging events in the case of successful event processing which are provided to billing systems of the SPEF and/or operator access domain. A charging event object would thus typically contain a unique charging event key as a reference, a unique service event ID which has been processed by the event, a unique session key which identifies the specific event, an operator domain ID of the operator who has processed the event, a timestamp and a charging record containing relevant charging information.

With respect to operator capabilities repository, an event sent by the SPEF 5 is independent of the capabilities of the OAD 11. If an event may not be processed (e.g., due to missing operator capabilities), the operator policy engine 29 may send an event as a response indicating that the event may not be processed. Such response may be forwarded by the event broker 7 to the event and request collector/mediator 27 of the SPEF 5 for further evaluation and optionally also to the customer API 25.

The [OAD] Operator capabilities repository [DB] may store one or more of the following elements: [OAD] Network setup [OBJ]; [OAD] Access technology [OBJ], which describes the supported priority mechanism in the access network; [OAD] Access priority [OBJ], the value of which could be, e.g., privileged, high, medium, best effort; [OAD] Admission priority [OBJ], the value of which could be, e.g., privileged, high, medium, best effort; [OAD] Scheduling priority [OBJ], which may be a QoS class identifier (QCI) value as defined by, e.g., the operator; [OAD] Core [OBJ], which describes the supported priority mechanism in the core network; [OAD] Transport [OBJ], which describes the supported priority mechanism in the transport network; [OAD] IP priority [OBJ]; [OAD] Bandwidth [OBJ]; and [OAD] Service repository [DB], which contains a list of services which are supported by the OAD.

With respect to structure of rules, as described above, the policy engine 29 and the policy distribution engine 31 are part of the policy enforcement engine 23. The related requests, e.g., the service policy and machine configuration requests, and rules, e.g., composition, decomposition and distribution rules, are operator specific and are only described as objects in the present description. The SPOF 3 oversees the event broker rules and provisions the event broker 7 accordingly.

Rules within the policy enforcement engine 23 may be operator and infrastructure specific. These rules may include: [SPEF] and [OAD] Abstraction rule [OBJ], which provides the instructions to transform an incoming operator specific event into an abstract service policy request; [SPEF] and [OAD] Composition rule [OBJ], which provides the instructions to transform an abstract service policy request into a specific machine configuration request; [SPEF] and [OAD] Decomposition rule [OBJ], which provides the instructions to transform (or decompose) a specific machine configuration object (per network) into individual machine configuration instructions (per machine); and [SPEF] and [OAD] Distribution rule [OBJ], which provides the instructions which machine or network element should be configured with the individual machine configuration instructions.

Figure 6:
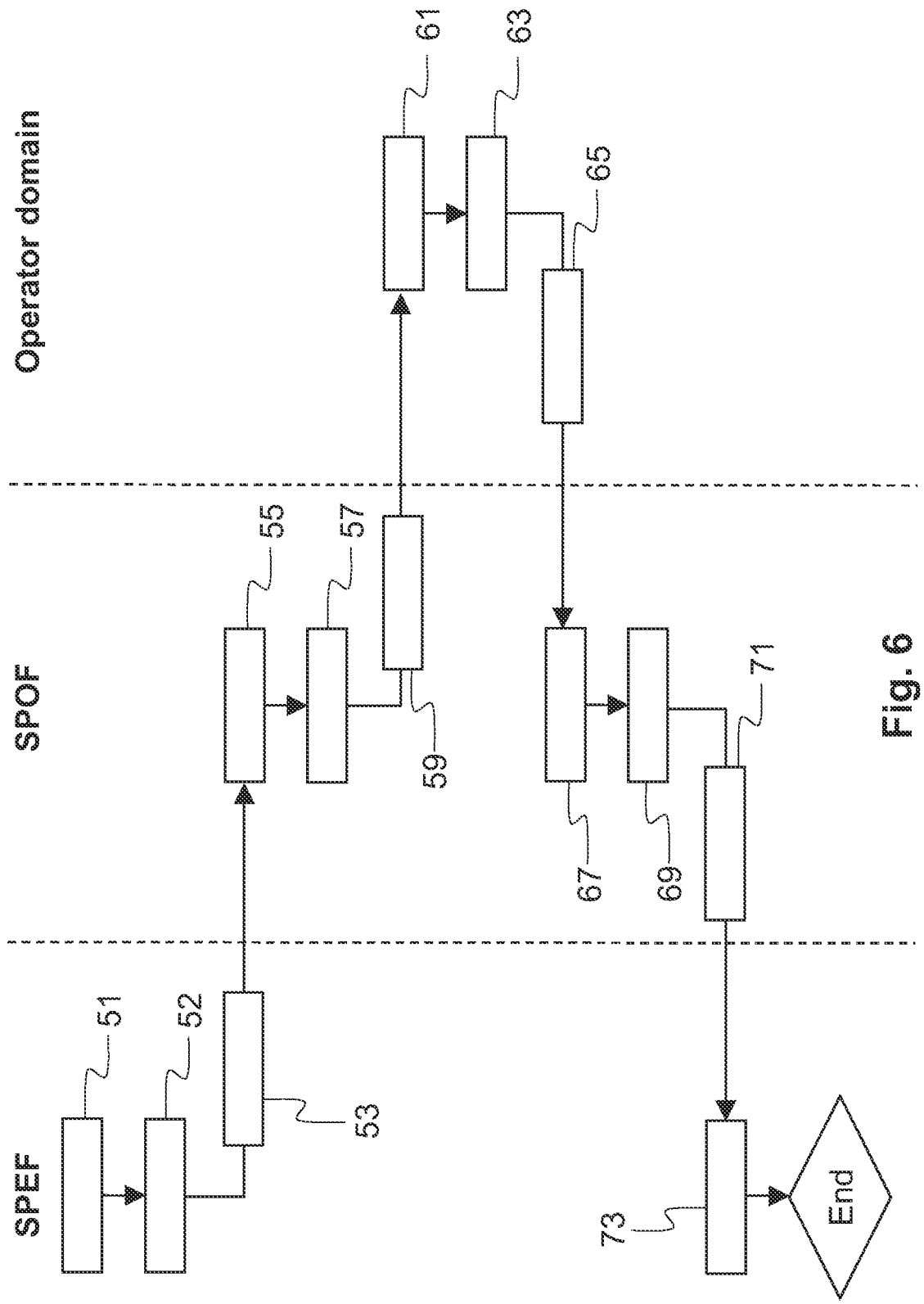
FIG. 6 is a flow chart illustrating a process of orchestrating a service policy in a communication network according to an example of the present invention.
Figure 7:
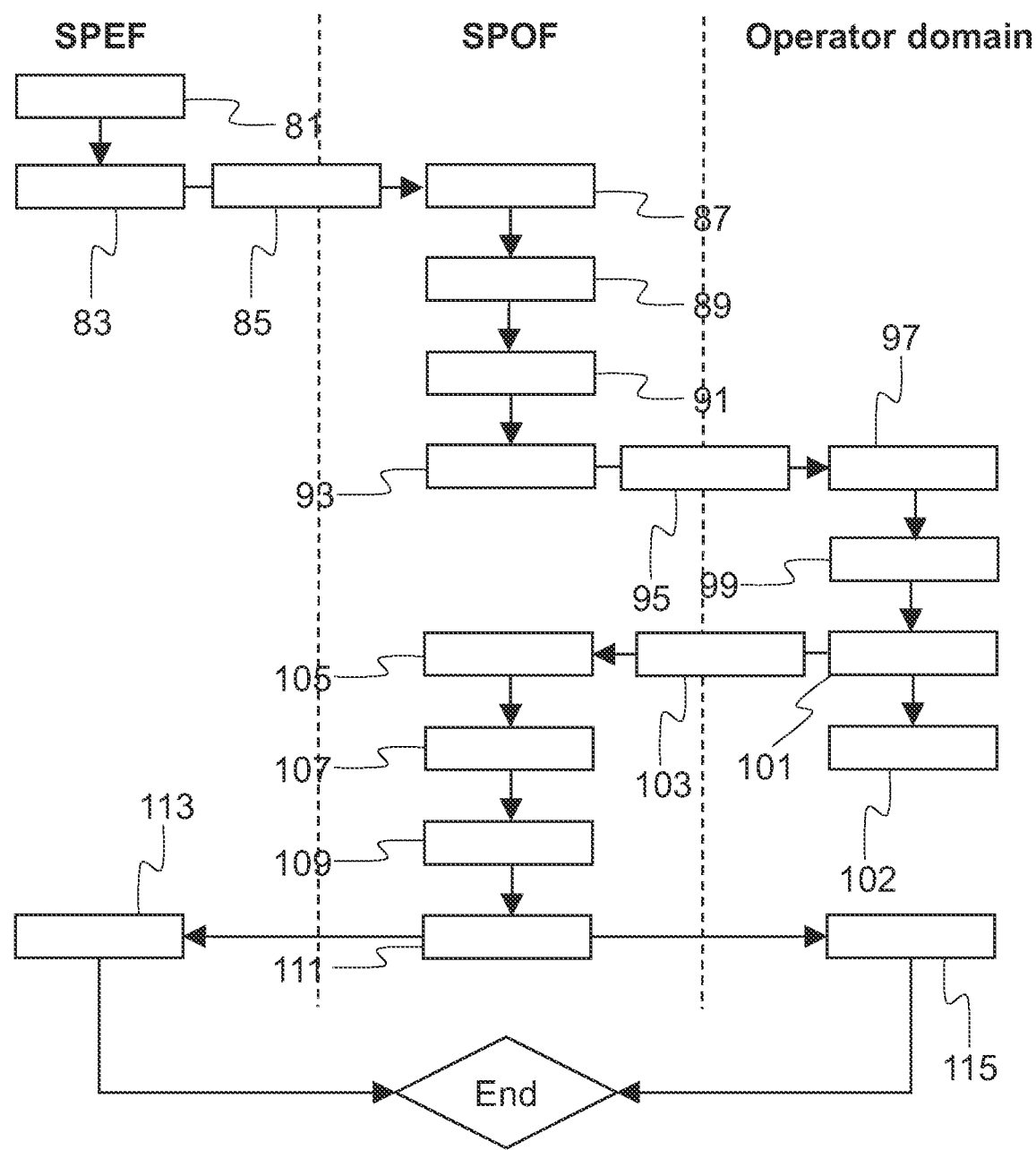
FIG. 7 is a flow chart illustrating a process of updating an event repository in the communication network according to an example of the present invention.

Example use cases, relating to various example implementations in accordance with the present disclosure, are described with respect to FIGS. 6 to 8, illustrating the interworking between the various elements and the creation and exchange of relevant objects to achieve desired QoS effects. In this regard, in the described scenarios corresponding to these use cases, the policy enforcement engine is depicted as a single element to simplify the description.

The final machine configuration of the service and/or access domain depends on, e.g., four main elements with the service being the central element: an event defines the relevant service, the criticality of the request (in time domain) and its lifetime that is, the event answers to the question "when"; a service defines the QoS requirements of the service per event. Different events could lead to different QoS requirements—that is, the service answers to the question "what"; a user defines the user's subscription and their subscribed services—that is, the user answers to the question "who"; and operator capabilities that define the network QoS support per service and subscription and how it is implemented—that is, the operator capabilities answer to the question "how". All four elements together may determine a machine configuration, which is operator specific, to fulfil the service requirements triggered by the event.

FIG. 6 is a flow chart illustrating a process of orchestrating a service policy in a communication network according to an example of the present invention.

Shown in FIG. 6 is a flow chart illustrating how a new service policy may be introduced to the service infrastructure—that is, the orchestration of a new service policy. Once a new service has been orchestrated (this process is assumed to be available but it is not the subject matter of the present invention), the relevant service policy information may be created and distributed.

In the example process illustrated in FIG. 7, as a prerequisite, the service repository 17 may be assumed to be available, including the following elements: Unique service instance [OBJ]; Service definition [OBJ] (including features, requirements etc.); Service provider [ID]; and Mapping table for operator specific services providing the association of OADs and operator specific service IDs. In other words, the mapping table for operator specific services comprises the operator domain IDs and the operator specific service IDs linked to them. Therefore, the service policy orchestration factory (e.g., SPOF 3 of FIG. 2) already knows which domains various service policies must be orchestrated to.

In step 51, the service policy execution factory (e.g., SPEF 5 of FIG. 2) requests or initiates the orchestration of a new service policy by selecting a service instance object. The SPEF 5 knows which service instance object it should select because the service orchestration has previously already been carried out. In other words, different service instance objects are each linked to a particular or given service event.

In step 52, the SPEF 5 creates a service event object (also referred to as a first service event object). The service event object in this example comprises the following items: a unique service event ID, a unique service instance ID, a mapping table for operator specific events, a type of event, criticality, lifetime, an area and a generic service execution rule. The service instance object and the service event object are in this example stored in the service policy inventory 15.

In step 53, the SPEF 5 sends the service instance object and the service event object to the SPOF 3. The service instance object defines service execution requirements, while the service event object defines an update of a current service execution policy.

In step 55, the SPOF 3 updates its service repository 17 with the service event object and the service instance object.

In step 57, the SPOF 3 selects the relevant operator domains IDs from the existing mapping table for operator specific services (stored in the service repository 17), which comprises the operator domain IDs and the associated operator specific service IDs. The selected operator domains should receive and execute the orchestration request. Step 57 is in this example carried out by the service policy creation and pairing algorithm 13. Thus, given OAD(s) is/are linked to particular service event object(s).

In step 59, the SPOF 3 sends the service event object and the relevant operator specific service ID to the appropriate OADs (there may be more than one). The operator specific service ID is linked to each one of the selected operator access domains (the ID is typically different for each operator access domain). The SPOF 3 retrieves the operator specific service ID from its mapping table for operator specific services, which is stored in the service repository 17. It is to be noted that each operator specific service ID is linked to a particular operator domain ID.

In step 61, the OAD then creates an operator specific event ID and in step 63 updates its own service repository 17 with the service event object. The received operator specific service ID is used to assign the service event to the correct service in the service repository.

In step 65, the OAD returns its operator domain ID as a feedback message, also referred to as a first feedback message, to the SPOF 3 indicating a successful orchestration.

In step 67, the SPOF 3 collects all operator domain IDs and updates its mapping table for operator specific events with the collected operator domain IDs in step 69. It is to be noted that the mapping tables used in steps 57 and 69 are not the same.

In step 71, the SPOF 3 sends the updated mapping table for operator specific events as a feedback message, also referred to as a second feedback message, to the SPEF 5.

In step 73, the SPEF 5 then updates its mapping table for operator specific events with the information it received in step 71. For example, it may replace its current mapping table for operator specific events with the one it received in step 71. Accordingly, with the completion of step 73, the service policy orchestration process is completed—that is, it comes to an end.

FIG. 7 is a flow chart illustrating a process of updating an event repository in the communication network according to an example of the present invention.

Shown in FIG. 7 is a flow chart illustrating the process of orchestrating an update of an event repository (e.g., the event repository 21) once a new service policy has been added to the service infrastructure. In other words, once a new service policy including relevant service events has been orchestrated, the associated generic service execution rules and event broker rules are created or updated and orchestrated.

The flow chart shown in FIG. 7 illustrates the orchestration of a distributed event policy, whereas the process illustrated in FIG. 6 described the orchestration of a static event policy. The orchestration of a distributed event policy is initiated by the SPEF 5, which controls the service requirements.

In step 81, the SPEF selects a service event object, also referred to as a second service event object, and the associated unique service instance ID and the unique service event ID, which are part of the service event object. The selected second service event object is, e.g., the distributed version of the first service event object. In other words, the second service event object is in this example the same as the first service event object but with different parameters.

In step 83, the service requirements, such as the type of event, criticality, lifetime and the generic service execution rule(s) are defined and included in the service event object. In other words, the service event object is updated with the information defined above.

In step 85, the SPEF 5 sends the unique service instance ID and the selected service event object to the SPOF 3.

In step 87, the SPOF 3 selects the relevant operator domains (and their IDs) and updates, in step 89, the mapping table for operator specific events.

In step 91, an event broker rule object is created, and in step 93, the SPOF 3 updates the event repository 21 with the service event object. The event broker rule object (per event) is created from the operator domain IDs (which may be included as such in a given event broker rule object) and from the generic service execution rule, which is part of the service event object.

In step 95, the SPOF 3 sends the service event object to the OADs 11.

In step 97, each OAD 11 creates its own operator specific event ID.

In step 99, the OAD analyses and processes the generic service execution rule, which it received as part of the service event object. Consequently, in step 101, the OAD creates an event broker rule.

In step 102, the OAD creates or updates its own operator specific service execution rule(s) within its policy enforcement engine 23.

In step 103, the OAD sends the operator specific event ID and the event broker rule to the SPOF 3 as a feedback message, also referred to as a third feedback message.

In step 105, the SPOF collects the feedback messages from the OADs. More specifically, the SPOF collects all operator specific event IDs and the event broker rules.

In step 107, the SPOF updates its mapping table for operator specific events with the received operator specific event ID(s).

In step 109, the event repository 21 of the event broker 7 is updated with the event broker rule(s) and the operator specific event ID(s) received in step 103.

In step 111, the SPOF 3 informs the OAD(s) 11 and the SPEF 5 that the event repository has been successfully updated by means of a fourth feedback message. The SPEF and the OADs confirm receipt of the fourth feedback message to the SPOF in steps 113 and 115, respectfully, and the orchestration of a distributed event policy process is completed—that is, it comes to an end.

It is to be noted that once the process depicted in the flow chart of FIG. 6 has been completed, the network knows which services are executed by given operators, while once the process depicted in the flow chart of FIG. 7 has been completed, the network knows which operators execute the events relating to a given service and how the events should be executed. In this example, the process of the flow charts of FIGS. 6 and 7 is carried out for every event that needs to be orchestrated.

The orchestration of a service-related event was described above. However, the teachings of the present invention equally apply to orchestration of a machine event. Machine events are originated by the OAD, are of relevance for the SPEF and may be grouped as follows: acknowledgement requests, e.g., success, deny, failure etc.; and network status, e.g., in operation, temporary service degradation, network outage etc.

To orchestrate an operator specific machine event, a corresponding unique machine event needs to be agreed upon between the SPOF 3 and OAD 11 beforehand. As the unique machine events are given, the SPOF requests operator specific event IDs per unique machine event as follows: 1) the SPOF 3 selects a machine event and sends an update request to all OADs which have not provided a corresponding operator specific machine event; 2) the SPOF 3 collects the operator specific machine events, creates the associated event broker rule and updates the mapping table for operator specific events; and 3) the SPOF 3 updates the event repository 21 of the event broker 7.

In some instances, the OADs (including their capabilities) may need to be updated. For instance, it is possible to add new services and/or features to the OADs. Thus, the service policy and events may need to be updated accordingly. It is assumed that the services are already orchestrated and based on this assumption, a trigger will be sent to the SPOF 3 to update the service policies and event repository 21 as follows: 1) the SPOF is triggered, such as by a new orchestration of an existing service (e.g., an existing service is orchestrated with an existing service), and/or by an OAD capabilities update, which leads to a request for an update of the service policy and event repository; and 2) the SPOF orchestrates the service policy and event repository as described in the flow charts of FIGS. 6 and 7.

Introducing a new OAD to an already existing infrastructure is handled in a similar manner. Again, the SPOF is triggered by the introduction of a new OAD and the service orchestration. The SPOF then orchestrates the service policy and event repository as described previously.

In rare cases where the event broker 7 receives an unknown event, it will notify the SPOF 3 about it. This case would be handled as a regular error handling process within the OADs 11.

FIG. 8 is a flow chart illustrating a process of executing a service policy in the communication network according to an example of the present invention. Shown in FIG. 8 is a flow chart illustrating an example process of handling a service policy request.

In an example use case relating to the process illustrated in FIG. 8, the SPEF 5 requests a service policy from two different OADs, namely domain A and domain B. The service policy request may concern, e.g., handover rules between these two different access domains (e.g., one public safety network operator and one public network operator).

In step 121, the service policy request is initiated via the SPEF 5, either by the service domain 36 or by the customer API 25. The policy enforcement engine 23 (and more specifically the event and request collector/mediator 27) of the SPEF evaluates the request in step 122 and selects an appropriate unique service event ID from the service repository 17.

In step 123, the SPEF creates a distributed service event object (also referred to as a third service event object, which may or may not relate to the first or second service event objects). This step involves defining the dynamic elements to be included in the service event object.

In step 125, the SPEF sends the service event object including the unique service event ID to the event broker 7.

In step 127, the event broker 7 selects the relevant operator domain IDs to convert, in step 129, the service event object into one or more operator specific event objects.

In step 131, the event broker evaluates or applies the event broker rules. The event broker rules define to which OAD 11 the event broker 7 should send the at least one operator specific event object, which are part of the event broker rules.

In step 133, the event broker forwards the operator specific event object (referred to also as a first operator specific event object) to the relevant OADs.

The events are evaluated by the OADs and more specifically by their policy enforcement engine. In other words, in step 135, the event is converted into an abstract service policy request object by the event and request collector/mediator 27, which is then forwarded to the policy engine 29.

In step 137, the policy engine evaluates the abstract service policy request and converts it into a machine configuration object and sends it to the policy distribution engine 31.

In step 139, the policy distribution engine 131 decomposes the machine configuration object into machine configurations, which are executed by the technical infrastructure of the OAD. The policy enforcement engine 23 uses the information provided by the service policy inventory 15 for its tasks. For instance, the service policy inventory 15 comprises the QoS requirements for a given service and they are used to reconfigure the network accordingly.

Once the OAD infrastructure has been configured, the process could be completed. However, the OAD infrastructure could create another operator specific event object (machine configuration related event) from the machine configuration, which is again evaluated by the policy enforcement engine 23 and sent to the event broker 7. Accordingly, in step 141 the OAD creates or selects an operator specific event object (referred to also as a second operator specific event object) and forwards it to the event object 7. The second operator specific event object comprises feedback information relating to the execution of the first operator specific event object.

In step 143, the event broker applies event broker rules and creates a new service event object (also referred to also as a fourth service event object, which is different from the first, second and third service event objects) based on the event broker rules. The created service event object is then forwarded to the SPEF where the event is processed in the same manner as within the OAD.

Thus, steps 145, 147, and 149 correspond to steps 135, 137 and 139, respectively. The result could be, e.g., a simple status update or a complete reconfiguration of the service domain. It is to be noted that the process depicted in the process illustrated in the flow chart of FIG. 8 is carried out every time a service policy request needs to be handled in the network.

Accordingly, one example of the present invention describes bandwidth or services allocation when the domain from which additional bandwidth or services are requested is not under the control of a single operator or entity. Instead of a strict policy enforcement, it uses a feedback system under a policy framework administered by just one entity.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed is:

1. A method of executing a service policy in a communication network, the method comprising:
at a service policy execution factory (SPEF):
initiating a service policy request;
evaluating the service policy request;
selecting a unique service event identifier (ID) from a service repository;
creating, based on the evaluating, a distributed service event object, the creating comprising defining dynamic elements to be included in the distributed service event object;
sending the distributed service event object with a unique service event ID to an event broker, wherein the event broker forwards, based on the distributed service event object, operator specific event data to one or more operator access domains (OADs); and
in response to receiving from the event broker a new service event object corresponding to the forwarding of the operator specific event data:
processing the received new service event object; and
updating information associated with a corresponding operator access domain (OAD) based on the processing.

2. The method according to claim 1, wherein processing the received new service event object comprises:
generating an abstract service policy request object;
evaluating the abstract service policy request object;
converting, based on the evaluating, the abstract service policy request object to a machine configuration object; and
decomposing the machine configuration object into machine configurations executable by technical infrastructure of the corresponding operator access domain (OAD).

3. The method according to claim 1, further comprising, at the event broker, in response to receiving the distributed service event object with the unique service event ID, selecting the one or more operator access domains (OADs).

4. The method according to claim 1, further comprising, at the event broker, in response to receiving the distributed service event object with the unique service event ID, converting the distributed service event object into one or more operator specific event objects corresponding to the one or more operator access domains (OADs).

5. The method according to claim 4, further comprising, at the event broker, forwarding the operator specific event object.

6. The method according to claim 1, further comprising, at the event broker, in response to receiving the distributed service event object with the unique service event ID, evaluating or applying one or more event broker rules.

7. The method according to claim 6, wherein the one or more event broker rules define, at least, criteria for determining operator access domains (OAD) to which the event broker should send at least one operator specific event object.

8. The method according to claim 1, further comprising, at each one operator access domain (OAD) of the one or more operator access domains (OADs), in response to receiving an operator specific event object from the event broker:
generating an abstract service policy request object;
evaluating the abstract service policy request object;
converting, based on the evaluating, the abstract service policy request object to a machine configuration object; and
decomposing the machine configuration object into machine configurations executable by technical infrastructure of the one operator access domain (OAD).

9. The method according to claim 8, further comprising, at each selected operator access domain (OAD):
creating or selecting a second operator specific event object; and
forwarding the second operator specific event object to the event broker;
wherein the second operator specific event object comprises feedback information relating to the execution of the received operator specific event object.

10. The method according to claim 9, further comprising, at the event broker, in response to receiving each second operator specific event object:
applying event broker rules; and
creating a new service event object based on the event broker rules.

11. A system for executing a service policy in a communication network, the system comprising:
one or more circuits configured to, at a service policy execution factory (SPEF):
initiate a service policy request;
evaluate the service policy request;
select a unique service event identifier (ID) from a service repository;
create, based on the evaluating, a distributed service event object, the creating comprising defining dynamic elements to be included in the distributed service event object;
send the distributed service event object with a unique service event ID to an event broker, wherein the event broker forwards, based on the distributed service event object, operator specific event data to one or more operator access domains (OADs); and
in response to receiving from the event broker a new service event object corresponding to the forwarding of the operator specific event data:
process the received new service event object; and
update information associated with a corresponding operator access domain (OAD) based on the processing.

12. The system according to claim 11, wherein the one or more circuits are further configured to, when processing the received new service event object at the service policy execution factory (SPEF):
generate an abstract service policy request object;
evaluate the abstract service policy request object, convert, based on the evaluating, the abstract service policy request object to a machine configuration object; and decompose the machine configuration object into machine configurations executable by technical infrastructure of the corresponding operator access domain (OAD).

13. The system according to claim 11, wherein the one or more circuits are further configured to, at the event broker, in response to receiving the distributed service event object with the unique service event ID, select the one or more operator access domains (OADs).

14. The system according to claim 11, wherein the one or more circuits are further configured to, at the event broker, in response to receiving the distributed service event object with the unique service event ID, convert the distributed service event object into one or more operator specific event objects corresponding to the one or more operator access domains (OADs).

15. The system according to claim 14, wherein the one or more circuits are further configured to, at the event broker, forward the operator specific event object.

16. The system according to claim 11, wherein the one or more circuits are further configured to, at the event broker, in response to receiving the distributed service event object with the unique service event ID, evaluate or applying one or more event broker rules.

17. The system according to claim 16, wherein the one or more event broker rules define, at least, criteria for determining operator access domains (OAD) to which the event broker should send at least one operator specific event object.

18. The system according to claim 11, wherein the one or more circuits are further configured to, at each one operator access domain (OAD) of the one or more operator access domains (OADs), in response to receiving an operator specific event object from the event broker:

generate an abstract service policy request object;

evaluate the abstract service policy request object;

convert, based on the evaluating, the abstract service policy request object to a machine configuration object; and decompose the machine configuration object into machine configurations executable by technical infrastructure of the one operator access domain (OAD).

19. The system according to claim 18, wherein the one or more circuits are further configured to, at each selected operator access domain (OAD):

create or selecting a second operator specific event object; and forward the second operator specific event object to the event broker;

wherein the second operator specific event object comprises feedback information relating to the execution of the received operator specific event object.

20. The system according to claim 19, wherein the one or more circuits are further configured to, at the event broker, in response to receiving each second operator specific event object:

apply event broker rules; and create a new service event object based on the event broker rules.

* * * * *